United States Patent
Wang et al.

(10) Patent No.: US 8,726,346 B2
(45) Date of Patent: May 13, 2014

(54) SECURE PROVISION OF A DIGITAL CONTENT PROTECTION SCHEME

(71) Applicant: Intel Corporation, Santa Clara, CA (US)

(72) Inventors: Changliang Wang, Bellevue, WA (US); Periyakaruppan Kumaran Kalaiyappan, Kuala Lumpur (MY); Xiaoyu Ruan, Folsom, CA (US); Radhakrishnan Venkataraman, Folsom, CA (US); Scott Janus, Rocklin, CA (US); Tze Sen Fung, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/657,954

(22) Filed: Oct. 23, 2012

(65) Prior Publication Data

US 2013/0145424 A1 Jun. 6, 2013

(51) Int. Cl.
*G06F 7/04* (2006.01)

(52) U.S. Cl.
USPC .......... 726/2; 726/4; 726/16; 726/17; 726/18; 726/19; 726/21; 726/26; 726/27

(58) Field of Classification Search
None
See application file for complete search history.

(56) References Cited

U.S. PATENT DOCUMENTS

| | | | |
|---|---|---|---|
| 7,043,456 B2 * | 5/2006 | Lindskog et al. | 705/76 |
| 7,827,613 B2 * | 11/2010 | Koved et al. | 726/26 |
| 2004/0177252 A1 * | 9/2004 | Vallee et al. | 713/170 |
| 2004/0205345 A1 * | 10/2004 | Ripley et al. | 713/176 |
| 2005/0066356 A1 * | 3/2005 | Stone et al. | 725/31 |
| 2005/0131832 A1 | 6/2005 | Fransdonk | |
| 2006/0093138 A1 | 5/2006 | Druand et al. | |
| 2007/0055887 A1 | 3/2007 | Cross et al. | |
| 2009/0055918 A1 * | 2/2009 | Chang et al. | 726/10 |
| 2009/0327705 A1 | 12/2009 | Ray et al. | |
| 2011/0013772 A1 * | 1/2011 | Roethig et al. | 380/200 |

FOREIGN PATENT DOCUMENTS

KR 2007000994 A 1/2007

OTHER PUBLICATIONS

Hadfield (Lee Hadfield, Dave Hater, Dave Bixler, "Windows NT Server 4 Security Handbook", 1997, ISBN: 078971213).*
International Search Report and Written Opinion mailed Aug. 22, 2012 in PCT Application No. PCT/US2011/062938, 9 pages.
Office Action mailed Jul. 2, 2013 for Korean Application No. 2012-7030566, 2 pages.

* cited by examiner

*Primary Examiner* — Peter Poltorak
(74) *Attorney, Agent, or Firm* — Schwabe, Williamson & Wyatt, P.C.

(57) ABSTRACT

Methods, apparatuses and storage medium associated with securely provisioning a digital content protection scheme are disclosed. In various embodiments, a method may include forming a trust relationship between a media application within an application execution environment of a device and a security controller of the device. The application execution environment may include an operating system, and the operating system may control resources within the application execution environment. Additionally, the security controller may be outside the application execution environment, enabling components of the security controller to be secured from components of the operating system. Further, the method may include the security controller in enabling a digital content protection scheme for the media application to provide digital content to a digital content protection enabled transmitter within the application execution environment for provision to a digital content protection enabled receiver. Other embodiments may be disclosed or claimed.

24 Claims, 4 Drawing Sheets

SECURE PROVISION OF A DIGITAL CONTENT PROTECTION SCHEME

RELATED APPLICATIONS

The present application claims priority under 35 U.S.C. §365(a) to International Application No. PCT/US2011/062938, filed Dec. 1, 2011, entitled "SECURE PROVISION OF A DIGITAL CONTENT PROTECTION SCHEME", which designates the United States of America. The entire contents and disclosure is hereby incorporated by reference in its entirety.

TECHNICAL FIELD

This application relates to the technical field of data processing, more specifically to methods and apparatuses associated with secure provision of a digital content protection scheme.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Secure playing of digital content often requires protection of the digital content when transmitted from a graphics unit to a display unit. Various schemes have been developed to protect the digital content from unauthorized copying during transmission, e.g., high-bandwidth digital content protection (HDCP), available from Digital Content Protection, LLC of Beaverton, Oreg. See HDCP Specification v1.4, published Jul. 8, 2009, for further information. Protection schemes, such as, HDCP, may be vulnerable, when the operating system is vulnerable to compromise, such as open source operating systems. The exposure may be increasing, as more and more computing devices, such as mobile computing devices (hereinafter, simply mobile devices), like personal digital assistants, smart phones, tablet computers, and so forth, employ open source operating systems.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION

Figure 1:
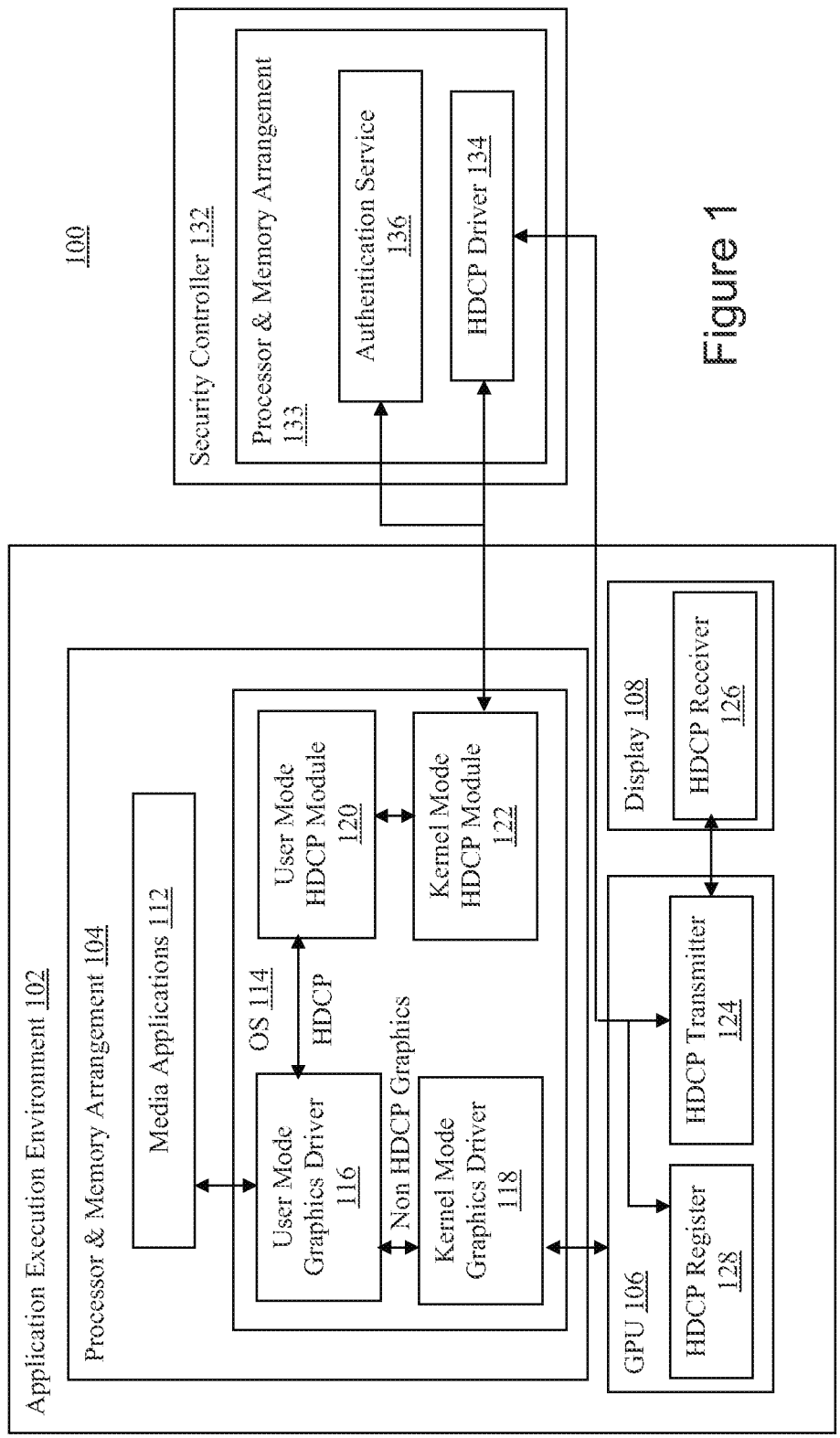
FIG. 1 illustrates an example computing device configured to provide secure provision of a digital content protection scheme.

Methods, apparatuses and storage medium associated with securely provisioning a digital content protection scheme are disclosed. In various embodiments, a method may include forming a trust relationship between a media application within an application execution environment of a device and a security controller of the device. The application execution environment may include an operating system, and the operating system may control resources within the application execution environment. Additionally, the security controller may be outside the application execution environment, enabling components of the security controller to be secured from components of the operating system. Further, the method may include the security controller provisioning (e.g., enabling and/or configuring) a digital content protection scheme for the media application to provide digital content to a digital content protection enabled transmitter within the application execution environment for provision to a digital content protection enabled receiver (directly or via one or more intermediate digital content protection enabled repeater).

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not he construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phase "at least one of A, B and C" means "(A), (B), (C), (A and B), (A and C), (B and C) or (A, B and C)".

FIG. 1 illustrates an example computing device configured to provide secure digital content protection, in accordance with various embodiments of the present disclosure. As shown, for the illustrated embodiments, computing device 100 may include application execution environment (AEE) 102 and security controller 132 coupled to each other. AEE 102 may include processor and memory arrangement 104 configured to have operating system (OS) 114 and media application 112 operated therein, graphics unit 106, and display unit 108. Security controller 132 may include processor and memory arrangement 133, authentication service 136 and HDCP driver 134. As will be described in more detail below, OS 114 and security controller 132 may be incorporated with teaching of the present disclosure to better protect digital content from unauthorized copying, when transmitted from graphics unit 106 to display unit 108. In particular, in various embodiments, graphics unit 106 may include HDCP register 128 and HDCP transmitter 124, while display unit 108 may be incorporated with HDCP receiver 126, all configured to securely play digital content in accordance with HDCP. For these embodiments, OS 114 and security controller 132 (in particular, authentication service 136 and HDCP driver 134) may be further incorporated with teaching of the present disclosure to better protect digital content from unauthorized copying under the HDCP scheme. In various embodiments, authentication service 136 and HDCP driver 134 may be implemented as firmware of security controller 132. In various embodiments, one or more intermediate HDCP repeaters (not shown) may be disposed in between HDCP transmitter 124 and HDCP receiver 126. Further, display unit 108 may be incorporated with a HDCP repeater as opposed to merely a HDCP receiver. Thus, all subsequent references to "HDCP receiver" in the description should be understood as "HDCP receiver" or "HDCP repeater," unless the context clearly indicates otherwise. While for ease of understanding, the remainder of the description will be substantially presented in the context of providing better, e.g., optimum, security for enabling/configuring protection for digital content from unauthorized copying under the HDCP scheme, however, the present disclosure is not so limited, and may be practiced to provide better/optimum security for enabling/configuring protection for digital content from unauthorized copying under other digital content protection schemes as well. Before further describing these teachings, it is noted that in various embodiments, display unit 108 with HDCP receiver 126 may be located outside AEE 102. Further, AEE 102 may include other components, such as persistent storage, networking interface, cameras, accelerometers, global positioning, and so forth.

In various embodiments, as described earlier, processor and memory arrangement 104 may be configured to enable OS 114 and one or more media applications 112 to be operated therein, while processor and memory arrangement 133 may be configured to enable authentication service 136 and HDCP driver 134 to be operated therein. Processor and memory arrangement 104/133 is intended to represent a broad range of processor and memory arrangement, including but are not limited to arrangements with single or multi-core processors of various execution speeds and power consumptions, and memory of various architectures with one or more levels of caches, and of various types, dynamic random access, FLASH, and so forth. Similarly, media applications 112 may be any application where parts of its operations involve playing digital media content on display unit 108.

In various embodiments, graphics unit 106 may be configured to provide graphics functions to media applications 112 and OS 114, while display unit 108 may be configured to display outputs of media applications 112 and OS 114. Further, as described earlier, graphics unit 106 may include HDCP register 128 and HDCP transmitter 124, whereas display unit 108 may include HDCP receiver 126, configured to provide HDCP to digital content being played by media applications 112 on display unit 108, through graphics unit 106.

In various embodiments, OS 114 may include various conventional components, including user mode graphics driver 116, and kernel mode graphics driver 118 configured to facilitate media applications 112 and OS 114 in using graphics functions provided by graphics unit 106. Further, to better address the potential security vulnerability of graphics drivers 116 and 118, OS 114 may further include user mode HDCP module 120 and kernel mode HDCP module 122, configured to facilitate media applications 112 in playing digital content on display unit 108, through security controller 132, thereby providing better protection for the digital content, when transmitted from graphics unit 106 to display unit 108, in particular, from HDCP transmitter 124 of graphics unit 106 to HDCP receiver 126 of display unit 108. To facilitate the use of user mode HDCP module 120 and kernel mode HDCP module 122, user mode graphics driver 116 may be modified to route all HDCP related operations to user mode HDCP module 120, instead. various embodiments, security controller 132 may provide a secured operating environment for authentication service 136 and HDCP driver 134, sequestering or sheltering authentication service 136 and HDCP driver 134 from components of OS 114. In other words, OS 114, including its components, does not have access to the execution resources of security controller 132, and therefore does not have access to authentication service 136 and HDCP driver 134. In various embodiments, authentication service 136 may be configured to form a trust relationship with media application 112, enabling security controller 132 to route digital content of media application 112, for media application 112, to HDCP transmitter 124, and ultimately to HDCP receiver 126. HDCP driver 134 may be configured to drive HDCP transmitter 124, and control its interactions with HDCP receiver 126, including controlling HDCP transmitter 124 in performing the various authentications under the HDCP scheme. In various embodiments, user mode HDCP module 120 and kernel mode HDCP module 122 may be configured to provide pass through access to HDCP driver 134. Accordingly, by virtue of the secured operating environment, security controller 132 provides for authentication service 136 and HDCP driver 134, in various embodiments, OS 114 may be an open source operating system.

In various embodiments, user mode HDCP module 120 may be configured to support a number of application programming interface (API) calls for user mode graphics driver 116 to route HDCP related operations to user mode HDCP module 120. In various embodiments, the API calls may include a call to enable HDCP, call to disable HDCP, a call to request HDCP status, and a call to obtain the report back HDCP status. In various embodiments, these API calls may be implemented in any high level languages, such as C, or assembly language supported by the processors of processor and memory arrangement 104.

In various embodiments user mode HDCP module 120 and kernel mode HDCP module 122 employ a number of buffers to pass data between the modules. In various embodiments, kernel mode HDCP module 122 includes a Read File function and a Write file function to retrieve data from, and write data into security controller 132.

Figure 2:
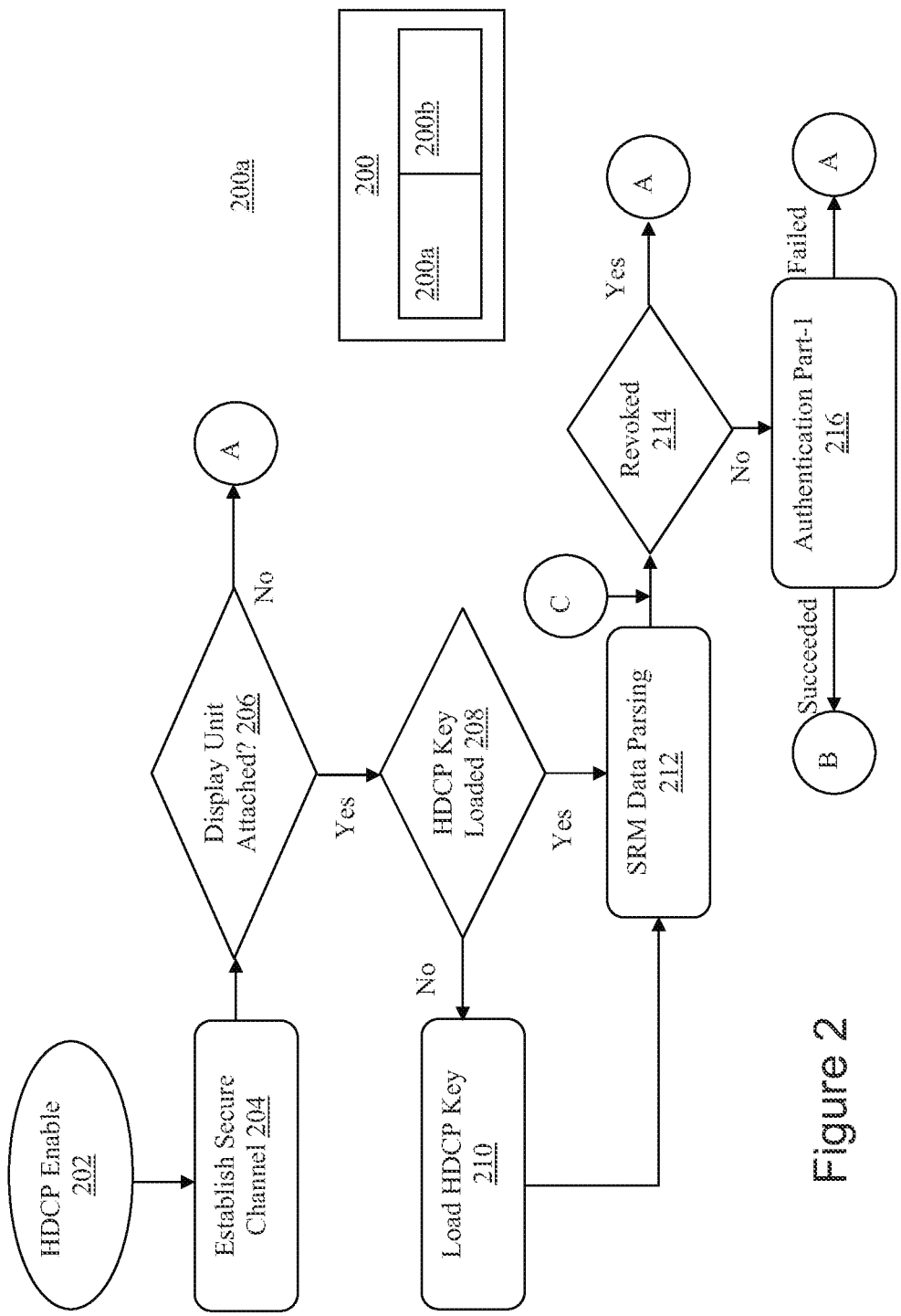
FIGS. 2 and 3 illustrate a method for secure provisioning of a digital content protection scheme.
Figure 3:
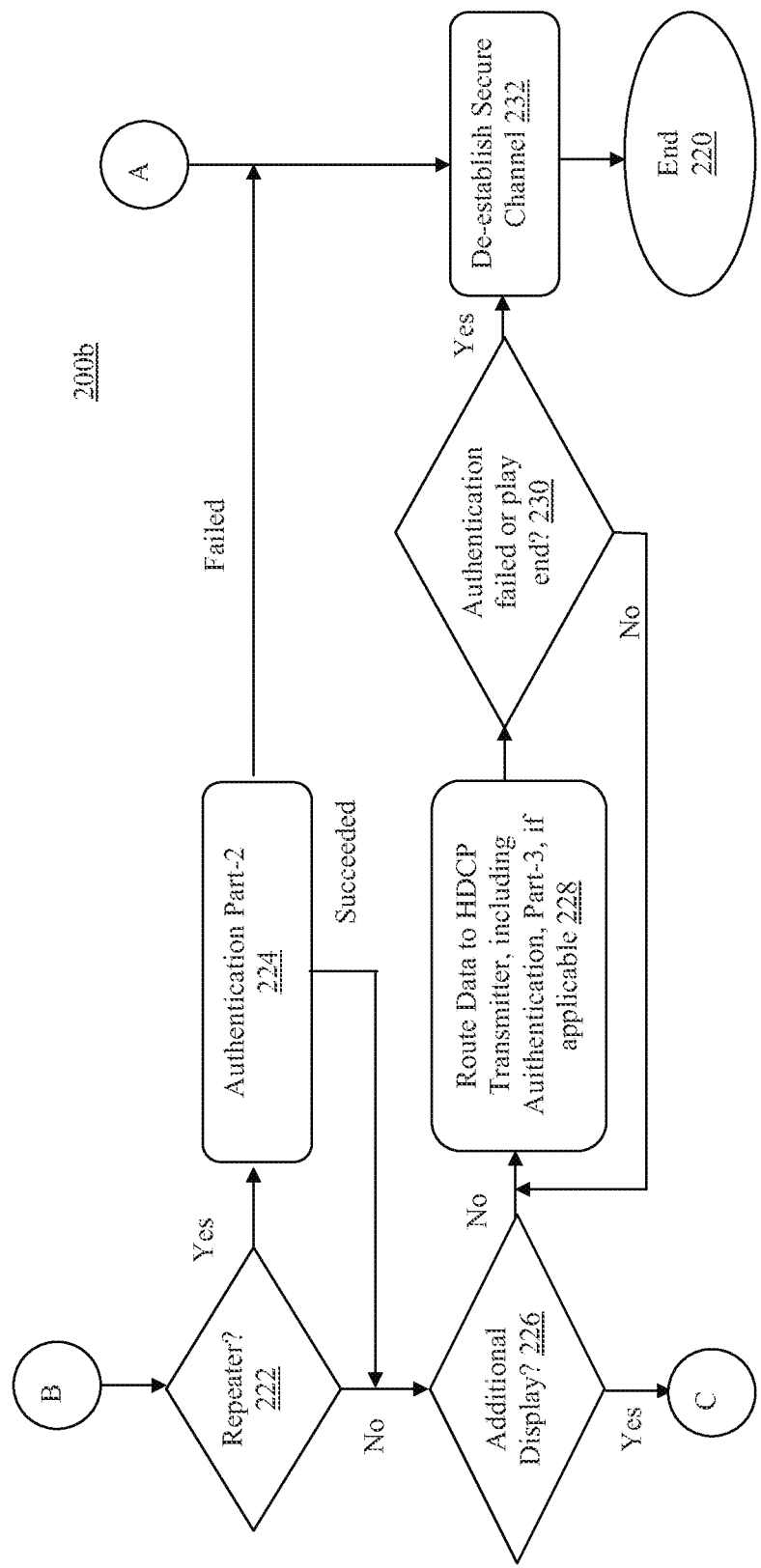

FIGS. 2 and 3 illustrate a method of operation for secure provisioning of a digital content protection scheme, in accordance with various embodiments. As shown, method 200 may begin at block 202 with HDCP driver 134 receiving a HDCP enable request from media application 112, through user mode HDCP module 120, kernel mode HDCP module 122, and authentication service 136. From block 202, the process may proceed to block 204, where authentication service 136 may authenticate security controller 132 to media application 112. On authentication, HDCP driver 134 may establish, in response to the HDCP enable request, a secure channel of communication with media applications 112, to enable media application 112 to trust components operating within security controller 132, including in particular, HDCP driver 134, to proceed with HDCP operations. In various embodiments, the secure channel may be established in accordance with a cryptographic identification protocol that preserves the privacy of security controller 132, e.g. the enhanced privacy identification (EPID) protocol developed by Intel® Corporation.

From block 204, method 200 may proceed to block 206, where HDCP driver 134 may detect whether display unit 108 is attached. If present of display unit 108 is not detected, method 200 may proceed from block 206 to block 232, then to block 220, where authentication service 136 may de-establish the secure channel, and end method 200. On the other hand, if presence of display unit 108 is detected, method 200 may proceed from block 206 to block 208, where HDCP driver 134 may detect if a HDCP key has been loaded. On detection of the HDCP key having been loaded, method 200 may proceed to block 212. However, if no HDCP key was detected, method 200 may proceed to block 210, where HDCP driver 134 may load a HDCP key, before proceeding to block 212. At block 212, HDCP driver 134 may parse system renewability message (SRM) data, from the HDCP enable request (or other communications from media application 112), for HDCP operation.

From block 212, method 200 may proceed to block 214 where HDCP driver 134 may determine whether the credential of HDCP receiver 126 has been revoked or not. If the credential of HDCP receiver 126 has been revoked (by the credential authority of HDCP), method 200 may proceed from block 214 to blocks 232 and 220, and terminate, as described earlier. On the other hand, if credential of HDCP receiver 126 has not been revoked, method 200 may proceed to block 216, where HDCP driver 134 may drive HDCP transmitter 124 to perform HDCP authentication, part-1, with HDCP receiver 126.

From block 216, on failure to authenticate HDCP receiver 126, method 200 may proceed to blocks 232 and 220, and terminate, as earlier described. However, on successful authentication of HDCP receiver 126, method 200 may proceed to block 222, where HDCP driver 134 may determine whether the HDCP receiver is a repeater. On determining that a HDCP receiver is a repeater, method 200 may proceed to block 224, where HDCP driver 134 may drive HDCP transmitter 124 to perform HDCP authentication, part-2 for repeaters.

On determining that a HDCP receiver is not a repeater or on successful authentication of a HDCP repeater, method 200 may proceed to block 226 where HDCP driver 134 may determine whether there are additional display units present. On determining that at least another additional display unit is present, method 200 may proceed to block 214 to authenticate the HDCP receiver of the additional display unit (or an intermediate repeater to the HDCP receiver of the additional display), as described earlier.

On determining that all HDCP receivers of display units (including any intermediate repeaters) have been authenticated, method 200 may proceed to block 228, where media application 112 may route digital content to the authenticated HDCP receivers of the detected display units (through the authenticated HDCP transmitter and/or repeater). Routing of the digital content from the HDCP transmitter to the HDCP receiver may be encrypted. At block 228, for video digital content, HDCP driver 134 may also drive HDCP transmitter 124 and HDCP receiver 126 to perform HDCP authentication, part-3, for encryption and decryption of video digital content, during vertical blanking intervals of the video digital content.

From block 228, method 200 may proceed to block 230, where HDCP driver 134 may detect for any HDCP part-3 authentication failure, or end of play of the digital content by media application 112. If neither conditions are detected, method 200 may return to block 228, and continue operations as earlier described. On the other hand, if either a HDCP part-3 authentication failure or end of play is detected, method 200 may proceed to block 230, where authentication service 136 may de-establish the secure channel between security controller 132 and media application 112. Thereafter, method 200 may proceed to block 220 where method 200 may terminate.

For further information on HDCP, refer to the HDCP Specification v1.4 identified earlier.

Figure 4:
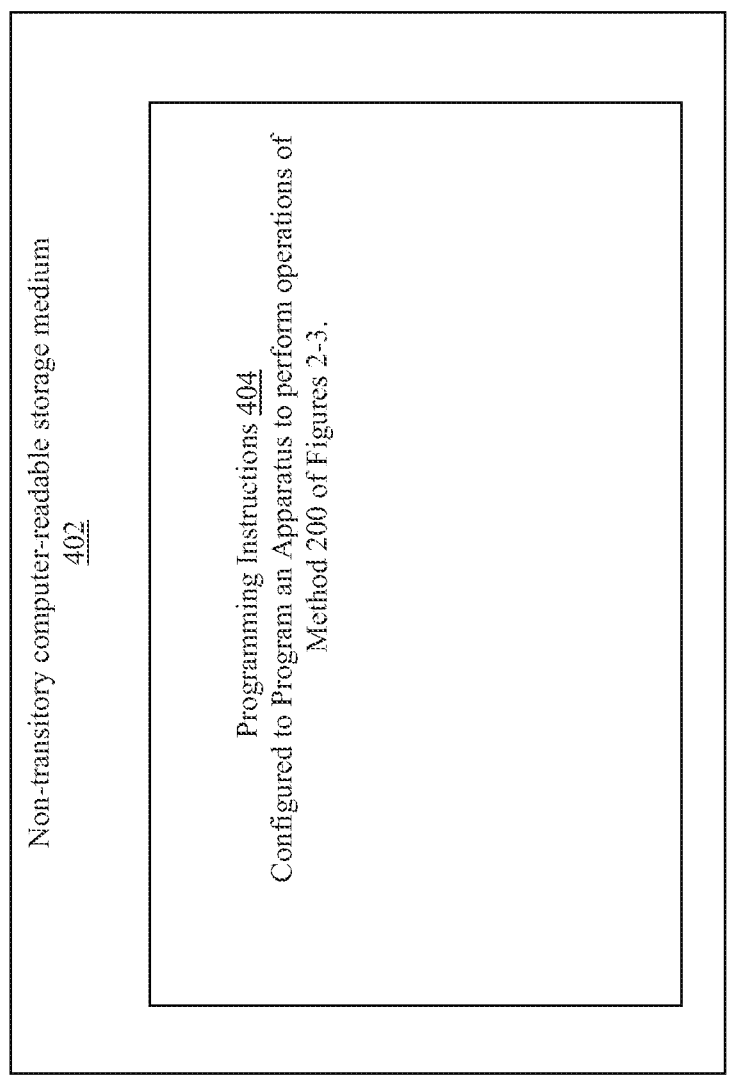
FIG. 4 illustrates an example non-transitory computer-readable storage medium having instructions configured to practice all or selected aspects of the method of FIGS. 2-3; all arranged in accordance with embodiments of the present disclosure.

FIG. 4 illustrates an example non-transitory computer-readable storage medium having instructions configured to practice all or selected aspects of the method of FIGS. 2-3; in accordance with various embodiments of the present disclosure. As illustrated, non-transitory computer-readable storage medium 402 may include a number of programming instructions 404. Programming instructions 404 may be configured to enable a computing device 100, in response to execution of the programming instructions, to perform the authentication service and/or HDCP driver operations of method 200 earlier described with references to FIGS. 2-3. In alternate embodiments, programming instructions 404 may be disposed on multiple non-transitory computer-readable storage media 402 instead. As described earlier, in various embodiments, the programming instructions may be configured to implement authentication service 136 and HDCP driver 134 as firmware of security controller 132.

Referring back to FIG. 1, for one embodiment, at least one of the processor(s) of processor and memory arrangement 133 may be packaged together with computational logic configured to practice the method of FIGS. 2-3. For one embodiment, at least one of the (processor(s) of processor and memory arrangement 133 may be packaged together with computational logic configured to practice the method of FIGS. 2-3 to form a System in Package (SiP). For one embodiment, at least one of the processor(s) of processor and memory arrangement 133 may be integrated on the same die with computational logic configured to practice the method of FIGS. 2-3. For one embodiment, at least one of the processor(s) of processor and memory arrangement 133 may be integrated on the same die with computational logic configured to practice the method of FIGS. 2-3 to form a System on Chip (SoC). For at least one embodiment, the SoC may be utilized in a smart phone, cell phone, tablet, or other mobile device.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

What is claimed is:

1. At least one non-transitory computer-readable storage medium having a plurality of instructions configured to enable a security controller of a device, in response to execution of the instructions by the security controller of the device, to provide a sequestered digital content protection provision service to the device, including:

an authentication service configured to form a trust relationship between a media application within an application execution environment of the device and the security controller, wherein the application execution environment includes an operating system, and the operating system controls resources within the application execution environment, and wherein the security controller is outside the application execution environment, enabling components of the security controller to be secured from components of the operating system; and a digital content protection driver configured to provision a digital content protection scheme for the media application to provide digital content to a digital content protection enabled transmitter within the application execution environment for provision to a digital content protection enabled receiver;

wherein the digital content protection driver is configured to de-establish a secure channel of communication with the media application, in response to a failure to authenticate the digital content protection enabled receiver.

2. The at least one computer-readable storage medium of claim 1, wherein the authentication service is configured to cryptographically authenticate the security controller to the media application and preserve privacy of the security controller.

3. The at least one computer-readable storage medium of claim 1, wherein the digital content protection driver is configured to establish a secure channel of communication with the media application.

4. The at least one computer-readable storage medium of claim 1, wherein the digital content protection driver is configured to communicate with the media application through a kernel mode digital content protection module within the application execution environment.

5. The at least one computer-readable storage medium of claim 4, wherein the kernel mode digital content protection module is configured to communicate with the media application through a user mode digital content protection module, which is configured to communicate with the media application through a user mode graphics driver, wherein the user mode digital content protection module and the user mode graphics driver are both within the application execution environment.

6. The at least one computer-readable storage medium of claim 1, wherein the digital content protection driver is configured to determine whether a digital content protection key has been loaded, and to load the digital content protection key, in response to a determination that the digital content protection key has not been loaded.

7. The at least one computer-readable storage medium of claim 1, wherein the digital content protection driver is configured to parse communication from the media application for system renewability data, after a determination that a digital content protection key has been loaded.

8. The at least one computer-readable storage medium of claim 1, wherein the digital content protection driver is configured to drive the digital content protection enabled transmitter to authenticate the digital content protection enabled receiver.

9. The at least one computer-readable storage medium of claim 1, wherein the digital content protection driver is configured to determine whether an authorization to play media content has been revoked, and block media content play, in response to a determination that the authorization to play media content has been revoked.

10. The at least one computer-readable storage medium of claim 1, wherein the digital content protection driver is configured to determine whether the digital content protection enabled receiver is a repeater.

11. The at least one computer-readable storage medium of claim 10, wherein the digital content protection driver is configured to drive the digital content protection enabled transmitter to authenticate the repeater, on determination that the digital content enabled receiver is a repeater.

12. The at least one computer-readable storage medium of claim 6, wherein the digital content protection driver is configured to drive the digital content protection enabled transmitter and receiver, using the digital content protection driver, to authenticate encryption and decryption of digital video content during vertical blanking intervals of the digital video content.

13. A method comprising:
forming a trust relationship between a media application within an application execution environment of a device and a security controller of the device, wherein the application execution environment includes an operating system, and the operating system controls resources within the application execution environment, and wherein the security controller is outside the application execution environment, enabling components of the security controller to be secured from components of the operating system; and enabling, by the security controller, a digital content protection scheme for the media application to provide digital content to a digital content protection enabled transmitter within the application execution environment for provision to a digital content protection enabled receiver, including de-establish a secure channel of communication with the media application, in response to a failure to authenticate the digital content protection enabled receiver.

14. The method of claim 13, wherein forming comprises cryptographically authenticating the security controller to the media application and preserving privacy of the security controller.

15. The method of claim 13, wherein enabling further comprising establishing, by the security controller, the secure channel of communication with the media application.

16. The method of claim 13, wherein enabling comprises receiving, by the security controller, a digital content protection enablement request of the media application, from a kernel mode digital content protection module within the application execution environment.

17. The method of claim 13, further comprising:
receiving the request by the kernel mode digital content protection module from a user mode digital content protection module;
receiving the request by the user mode digital content protection module from a user mode graphics driver; and
receiving the request by the user mode graphics driver from the media application;
wherein the user mode digital content protection module and the user mode graphics driver are both within the application execution environment.

18. The method of claim 13, further comprising
determining, by the security controller, whether a digital content protection key has been loaded, and loading the digital content protection key, by the security controller, in response to determining that the digital content protection key has not been loaded;
parsing for system renewability data from communication from the media application, by the security controller, after determining that a digital content protection key has been loaded;
driving the digital content protection enabled transmitter, by the security controller, to authenticate the digital content protection enabled receiver; or
determining, by the security controller, whether an authorization to play media content has been revoked, and blocking media content play, by the security controller, in response to determining that the authorization to play media content has been revoked.

19. The method of claim 13, further comprising determining, by the security controller, whether the digital content protection enabled receiver is a repeater; or driving the digital content protection enabled transmitter and receiver, by the security controller, to authenticate encryption and decryption of digital video content during vertical blanking intervals of the digital video content.

20. An apparatus comprising:
an application execution environment configured to host execution of an operating system, a media application, and a digital content protection enabled transmitter, wherein the operating system controls resources within the application execution environment;
a security controller coupled to the application execution environment, and configured to host a sequestered digital content protection service, including an authentication service configured to form a trust relationship with the media application, and a digital content protection driver configured to enable a digital content protection scheme for the media application to provide digital content to the digital content protection enabled transmitter, for provision to a digital content protection enabled receiver, wherein the authentication service and the digital content protection driver are secured from components of the operating system
wherein the digital content protection driver is configured to de-establish a secure channel of communication with the media application, in response to a failure to authenticate the digital content protection enabled receiver.

21. The apparatus of claim 20, wherein the authentication service is configured to cryptographically authenticate the security controller to the media application and preserve privacy of the security controller.

22. The apparatus of claim 20, wherein the digital content protection driver is configured to establish a secure channel of communication with the media application.

23. The apparatus of claim 20, wherein the digital content protection driver is further configured to drive the digital content protection enabled transmitter to authenticate the digital content protection enabled receiver, including when the receiver is a repeater.

24. The apparatus of claim 20, wherein the digital content protection driver is further configured to drive the digital content protection enabled transmitter and receiver to authenticate encryption and decryption of video digital content, during vertical blanking intervals of the video digital content.

* * * * *